United States Patent
Park et al.

(10) Patent No.: US 8,145,401 B2
(45) Date of Patent: *Mar. 27, 2012

(54) ACCELERATOR PEDAL SYSTEM

(75) Inventors: Hangil Park, Hwaseong (KR);
Yang-Rae Cho, Hwaseong (KR);
Bum-Sik Lee, Busan (KR)

(73) Assignees: Hyundai Motor Company, Seoul (KR);
SL Corporation, Daego (KR)

( * ) Notice: Subject to any disclaimer, the term of this patent is extended or adjusted under 35 U.S.C. 154(b) by 785 days.

This patent is subject to a terminal disclaimer.

(21) Appl. No.: 11/821,657

(22) Filed: Jun. 25, 2007

(65) Prior Publication Data

US 2008/0147287 A1 Jun. 19, 2008

(30) Foreign Application Priority Data

Dec. 14, 2006 (KR) .................. 10-2006-0128103

(51) Int. Cl.
*G05D 15/00* (2006.01)
*B62D 101/00* (2006.01)
*G06F 7/02* (2006.01)

(52) U.S. Cl. .......................... 701/70; 74/513

(58) Field of Classification Search .............. 701/70, 701/93; 180/334; 74/513, 514
See application file for complete search history.

(56) References Cited

U.S. PATENT DOCUMENTS

| 6,736,233 | B2 | 5/2004 | Beishline et al. | |
|---|---|---|---|---|
| 2002/0134611 | A1* | 9/2002 | Beishline et al. | 180/334 |
| 2002/0161487 | A1* | 10/2002 | Kojima et al. | 701/1 |
| 2003/0135317 | A1 | 7/2003 | Hijikata et al. | |
| 2005/0065687 | A1* | 3/2005 | Hijikata et al. | 701/41 |
| 2007/0032914 | A1* | 2/2007 | Kondoh et al. | 701/1 |

FOREIGN PATENT DOCUMENTS

| JP | 01-092537 | 4/1989 |
|---|---|---|
| JP | 2005-88796 A | 4/2005 |
| KR | 10-2006-0124906 | 12/2006 |

* cited by examiner

*Primary Examiner* — Khoi Tran
*Assistant Examiner* — Rodney King
(74) *Attorney, Agent, or Firm* — Morgan, Lewis & Bockius LLP

(57) ABSTRACT

An accelerator pedal system includes a pedal control unit that receives a vehicle speed signal and a signal from a switch, and compares the two signals. If the vehicle speed exceeds a preselected speed, the pedal control unit outputs a control signal to control a reaction force of an accelerator pedal on the basis of the preselected speed and a selected mode. The system also includes a reaction device that receives the control signal and controls the accelerator pedal according to the selected mode. The reaction device includes an actuator for generating power on the basis of the control signal, a power delivery unit for selectively transmitting the power generated by the actuator, and a wheel for receiving the power from the power delivery unit and transmitting the power to the accelerator pedal.

7 Claims, 4 Drawing Sheets

(a)

Constant duty cycle (b)

Pedal vibration (c)

Pedal torque pulses

ACCELERATOR PEDAL SYSTEM

CROSS-REFERENCE TO RELATED APPLICATION

This application claims priority to, and the benefit of, Korean Patent Application No. 10-2006-0128103 filed in the Korean Intellectual Property Office on Dec. 14, 2006, the entire contents of which are incorporated herein by reference.

BACKGROUND OF THE INVENTION (a) Field of the Invention

The present invention relates to an accelerator pedal system. More particularly, the present invention relates to an accelerator pedal system that warns a driver when a vehicle speed exceeds a preselected speed by producing a change in reaction force of the accelerator pedal.

(b) Description of the Related Art

A typical accelerator pedal system applies a reaction force to an accelerator pedal by elastic force of an elastic member when a vehicle speed exceeds a predetermined speed. The reaction force is controlled by a plurality of elastic members in quantized increments, so it is not controlled in detail.

The above information disclosed in this Background section is only for enhancement of understanding of the background of the invention and therefore it may contain information that does not form the prior art that is already known in this country to a person of ordinary skill in the art.

SUMMARY OF THE INVENTION

An accelerator pedal system includes a pedal control unit that receives a vehicle speed signal and a signal from a switch, and compares the two signals. If the vehicle speed exceeds a preselected speed, the pedal control unit outputs a control signal to control a reaction force of an accelerator pedal on the basis of the preselected speed and a selected mode. The system also includes a reaction device that receives the control signal and controls the accelerator pedal according to the selected mode. The reaction device is disposed between an upper end of the accelerator pedal and the vehicle body. The reaction device includes an actuator, such as a motor, for generating power on the basis of the control signal, a power delivery unit for selectively transmitting the power generated by the actuator, and a wheel for receiving the power from the power delivery unit and transmitting the power to the accelerator pedal.

The mode is selected from three modes: a first mode, in which the reaction force is substantially constant; a second mode, in which the reaction force generates a vibration of the accelerator pedal; and a third mode, in which the reaction force generates a knocking of the accelerator pedal.

A case is disposed between an upper portion of the accelerator pedal and the vehicle body, and the reaction device is located in the case.

The power delivery unit includes a first gear for receiving the power from the actuator, and a second gear for rotating the wheel as much as a predetermined angle by receiving the power from the first gear. The first gear is a spur gear. The second gear is a worm gear. The wheel is a worm wheel.

The system also includes a damper for damping the wheel.

DETAILED DESCRIPTION OF THE PREFERRED EMBODIMENTS

An exemplary embodiment of the present invention will hereinafter be described in detail with reference to the accompanying drawings.

The term "reaction force" in this specification is used to denote a force that acts on an accelerator pedal in the direction of its home position, that is, a direction opposite the direction in which the accelerator pedal is moved in order to accelerate the vehicle.

Figure 1:
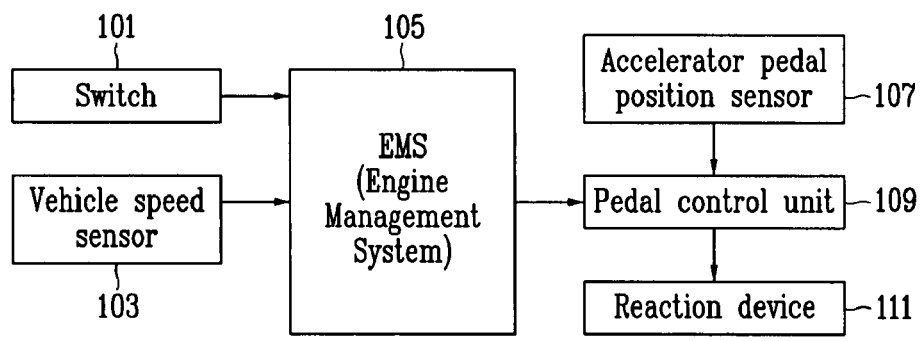
FIG. 1 is a block diagram of an accelerator pedal system according to an exemplary embodiment of the present invention.
Figure 2:
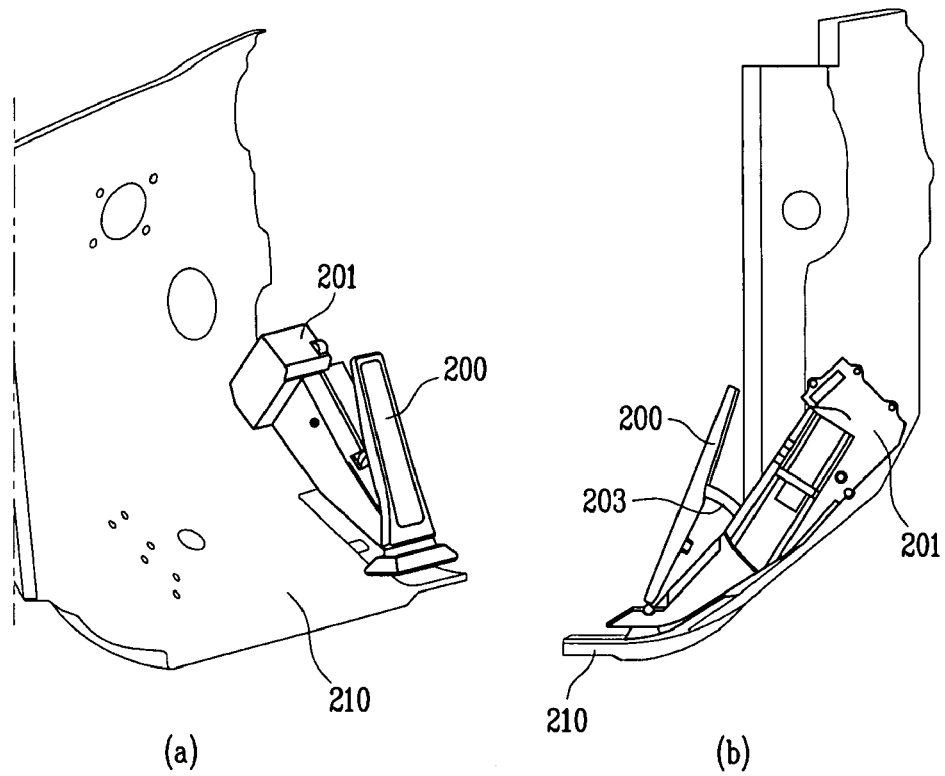
FIG. 2 shows the location of an accelerator pedal system according to an exemplary embodiment of the present invention.

Referring to FIGS. 1 and 2, an accelerator pedal 200 is rotatably connected to a vehicle body 210, and is connected to a rod 203. A switch 101 generates a signal corresponding to at least one preselected speed and a selected mode, as described below. An engine management system 105 receives signals from a vehicle speed sensor 103 and the switch 101.

An accelerator pedal position sensor 107 generates a signal indicative of the position of the accelerator pedal 200.

A pedal control unit 109 receives the vehicle speed signal and the switch signal from the engine management system 105. When the vehicle speed exceeds the preselected speed, the pedal control unit 109 outputs a control signal for controlling the reaction force of the accelerator pedal 200. The pedal control unit 109 also controls the reaction force depending on the mode, as described below.

The reaction device 111 receives the control signal from the pedal control unit 109 and operates the accelerator pedal 200 according to the selected mode.

Figure 3:
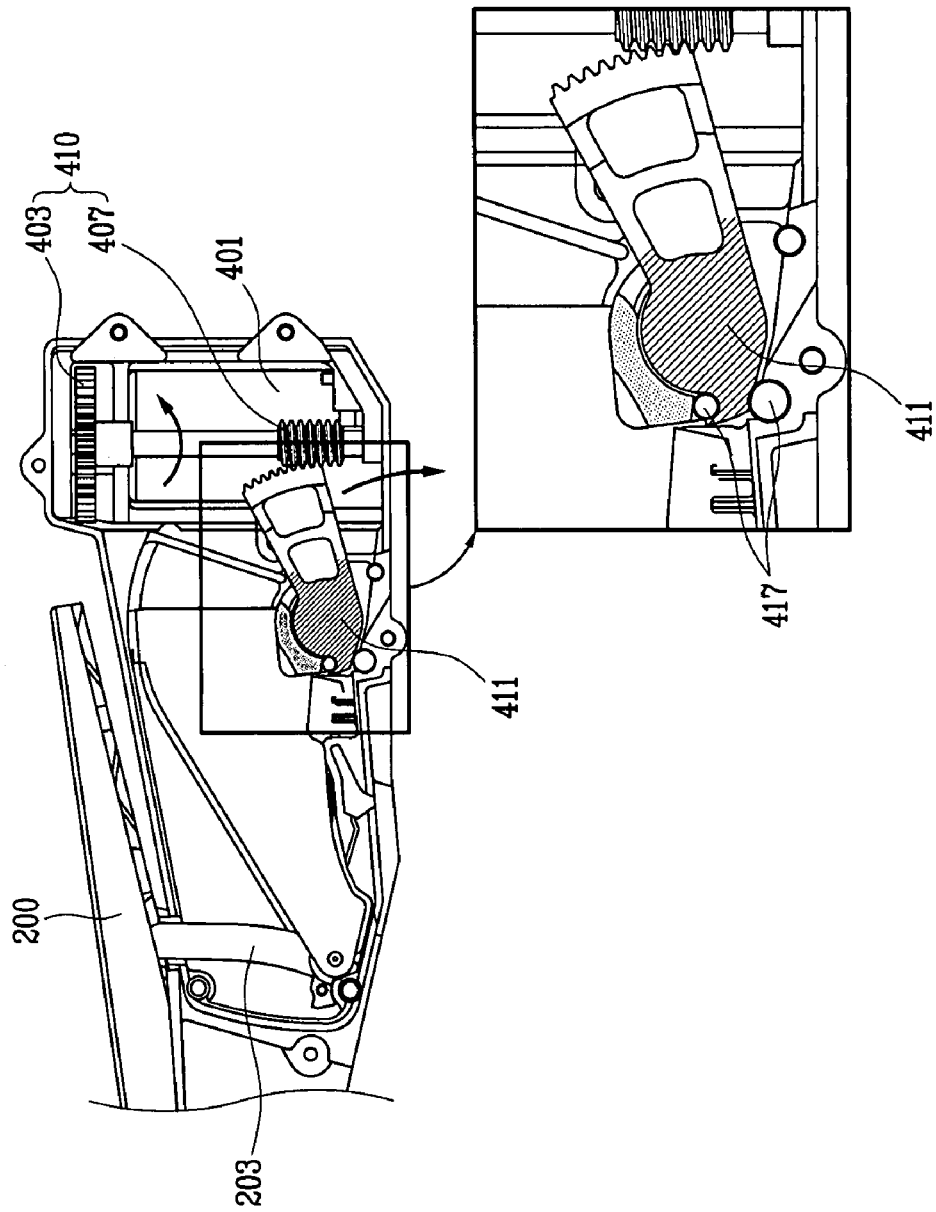
FIGS. 3 and 4 show operation of an accelerator pedal system according to an exemplary embodiment of the present invention.

Referring to FIG. 3, an exemplary reaction device 111 includes an actuator 401, which generates power by a current applied on the basis of the control signal, and is disposed in front of the pedal 200. The reaction device 111 also includes a power delivery unit 410, which selectively transmits the power generated by the actuator 401; and a wheel 411, which transmits the power from the power delivery unit 410 to the accelerator pedal 200.

The actuator 401 can generate different power depending on current applied from the pedal control unit 109. The switch 101 allows selection of at least one preselected speed, and of a mode.

The preselected speed is any speed that is regarded to be dangerous, and may be selected by a person of an ordinary skill in the art based on the teachings herein.

The modes are different ways of warning the driver that the vehicle speed exceeds the preselected speed, such as different ways of controlling the pedal reaction force of the accelerator pedal 200. A system with three modes will now be described in more detail for exemplary purposes only. The present invention is not limited to any particular number of modes.

If the first mode is selected, the accelerator pedal gives the driver a first type of warning, such as generating a constant reaction force. If the second mode is selected, the accelerator pedal gives the driver a second type of warning, such as generating vibrations. If the third mode is selected, the accelerator pedal gives the driver a third type of warning, such as generating a knock.

The preselected speed and the mode can be selected by the driver by operating the switch 101. In addition, a level of each mode, e.g., a level of the reaction force, vibration, and knocking can be controlled by the level of the current supplied to the actuator 401.

That is, the level of the reaction force, vibration, and knocking corresponding to each of several speed ranges and the speed corresponding to each mode can be selected by the driver.

Therefore, because the actuator is operated by the level of current, the modes and the level corresponding to the current can be determined in more detail and a detailed reaction force can be predetermined corresponding to each speed range.

The engine management system 105 can be selected by a person of ordinary skill in the art based on the teachings herein.

The accelerator pedal position sensor 107 sends the detected pedal position signal to the pedal control unit 109.

According to an exemplary embodiment of the present invention, when the signal from the accelerator pedal position sensor 107 corresponds to deep operation (e.g., over 85% of the stroke) of the accelerator pedal 200, or when the switch 101 is turned off, the accelerator pedal system suspends its operation.

The pedal control unit 109 may include a processor, memory, and associated hardware, software, and/or firmware, as may be selected and programmed by a person of ordinary skill in the art based on the teachings herein.

Referring to FIG. 2, the accelerator pedal system may further include a case 201 at an upper portion of the pedal 200. The reaction device 111 is located in the case 201. A heat sink (not shown) may be provided in the case 201 and the heat generated by the actuator 401 and the power delivery unit 410 may be exhausted through the heat sink.

The actuator 401 may be a motor, such as a direct current (DC) motor.

Referring to FIG. 3, according to an exemplary embodiment, the power delivery unit 410 includes a first gear 403 and a second gear 407. The first gear 403 may be a spur gear, while the second gear 407 may be a worm gear. The first gear 403 receives power from the actuator 401, and the second gear 407 receives the power from the first gear 403, and rotates the wheel 411 as much as a predetermined angle. The wheel 411 may be a worm wheel.

In addition, because the damper 417 is provided in a rotating direction of the accelerator pedal 200, impact by operation of the accelerator pedal 200 may not occur even if the accelerator pedal 200 is operated after the reaction device 111 is operated.

Figure 4:
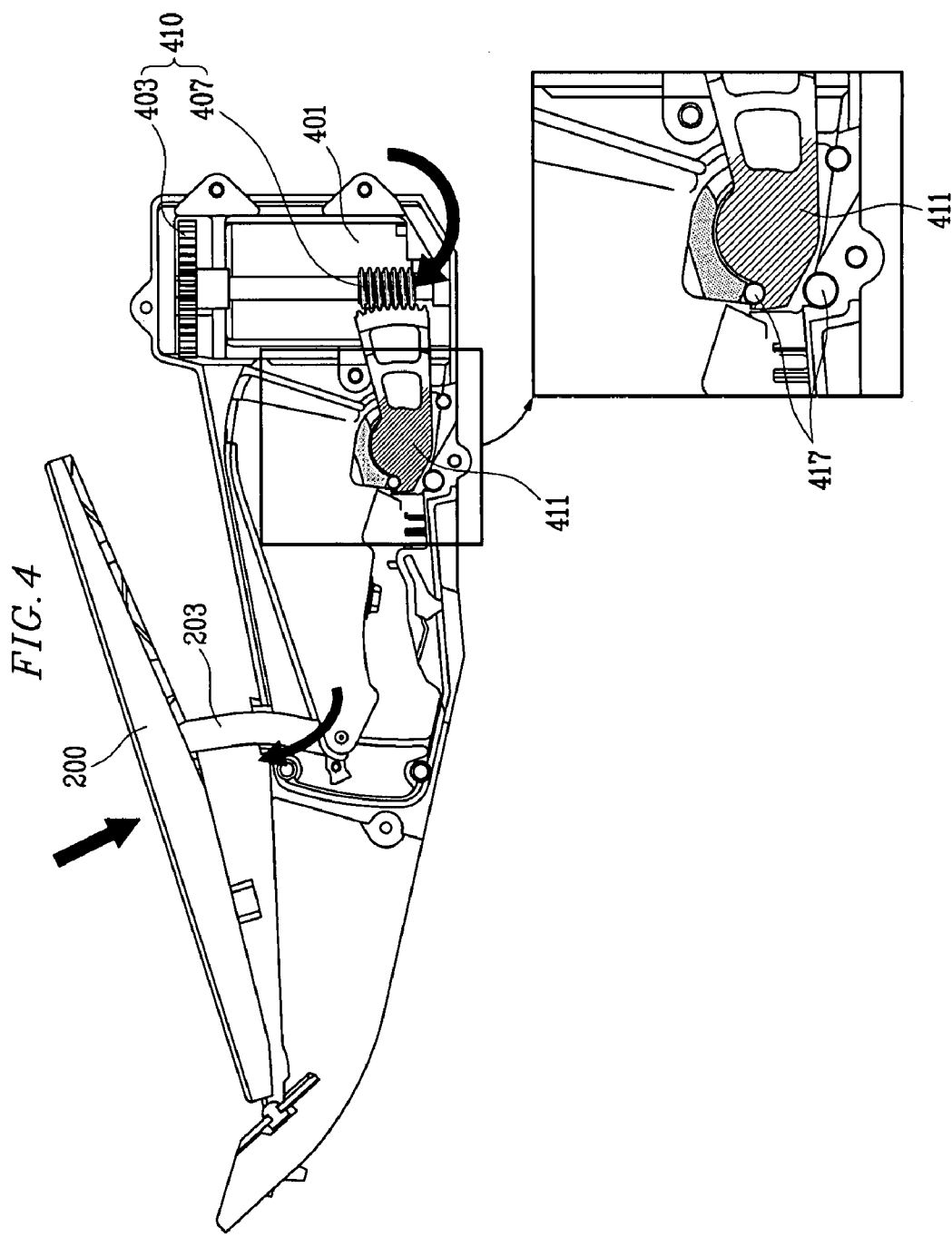

Referring to FIG. 1, FIG. 3, and FIG. 4, according to an exemplary embodiment of the present invention, operation of the accelerator pedal system will now be described.

FIG. 3 shows a non-operating state. If a driver operates the accelerator pedal 200, the accelerator pedal 200 returns to its home position by a spring (not shown).

As shown in FIG. 3, according to an exemplary embodiment of the present invention, when the accelerator pedal rotates, it does not contact the damper 417.

When a dangerous situation is detected, or when the vehicle speed exceeds a preselected speed in a selected mode, the engine management system 105 receives a corresponding signal and outputs it to the pedal control unit 109.

The dangerous situation may be detected by, for example, a vehicle navigation system or a front monitoring camera, and such a dangerous situation may be appropriately set by a person of an ordinary skill in the art based on the teachings herein.

When the pedal control unit 109 receives the corresponding signal, the pedal control unit 109 operates the reaction device 111 such that the first gear 403 and the second gear 407 sequentially rotate (refer to the arrows shown in the power delivery unit of FIG. 3). Then, the worm wheel 411 rotates clockwise in FIG. 3 and the damper 417 is contacted.

Therefore, in the state shown in FIG. 4, if the driver presses the accelerator pedal 200, the wheel 411 rotates and the first gear 403 and the second gear 407 sequentially rotate. Finally, the actuator 401 rotates, generating reaction force.

Heat generated by the power delivery unit 410 and the motor 401 is exhausted by the heat sink.

Therefore, the driver can feel the change of the reaction force of the accelerator pedal 200 and can notice the warning of a dangerous situation or the exceeding of a preselected speed.

According to an exemplary embodiment of the present invention, when the driver presses the accelerator pedal 200 more than a kick-down point (for example, more than 85% of the entire stroke of the accelerator pedal 200), or when the switch 101 is turned off, the accelerator pedal system is turned off, returning the wheel 411 of the reaction device 111 to its home position, as shown in FIG. 3.

That is, according to an exemplary embodiment of the present invention, the warning function can be turned off and a normal reaction force can act on the accelerator pedal 200. In addition, a plurality of warning modes can be utilized.

Figure 5:
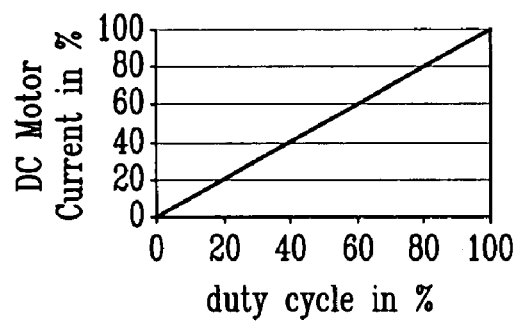
FIG. 5 shows first, second, and third modes of an accelerator pedal system according to an exemplary embodiment of the present invention.
Figure 5:
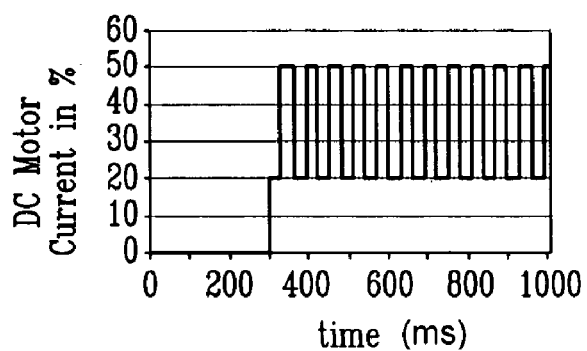
Figure 5:
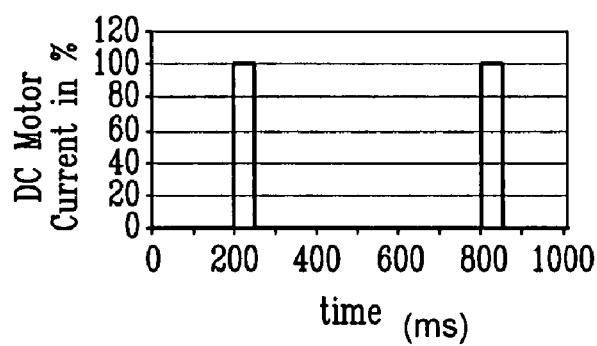

FIG. 5(a) shows a first mode, FIG. 5(b) shows a second mode, and FIG. 5(c) shows a third mode according to an exemplary embodiment.

As described above, current is applied to the actuator 401 by the pedal control unit 109 according to the mode. As shown in FIG. 5(a), the first mode may include constant current. As shown in FIG. 5(b), by applying current with a constant period, the accelerator pedal 200 vibrates, corresponding to the second mode. As shown in FIG. 5(c), if current is applied intermittently, the accelerator pedal 200 knocks, corresponding to the third mode.

In addition, the period of vibrations or knocking can be changed by changing the level of the current and the time for which the current is applied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An accelerator pedal system for controlling an accelerator pedal that is rotatably connected to a vehicle body at a base thereof, the system comprising:
   a pedal control unit that receives a vehicle speed signal and a signal from a switch, compares the two signals, and, if the vehicle speed exceeds a preselected speed, outputs a control signal to control a reaction force of an accelerator pedal on the basis of the preselected speed and a selected mode; and
   a reaction device that receives the control signal and controls the accelerator pedal according to the selected mode, wherein the reaction device is disposed between an upper end of the accelerator pedal and the vehicle body, and wherein the reaction device comprises:
   an actuator for generating power on the basis of the control signal;
   a power delivery unit for selectively transmitting the power generated by the actuator; and a wheel for receiving the power from the power delivery unit and transmitting the power to the accelerator pedal;

wherein the mode is selected from:

a first mode, in which the reaction force is substantially constant;

a second mode, in which the reaction force generates a vibration of the accelerator pedal; and a third mode, in which the reaction force generates a knocking of the accelerator pedal.

2. The accelerator pedal system of claim 1, further comprising a case between an upper portion of the accelerator pedal and the vehicle body, wherein the reaction device is located in the case.

3. The accelerator pedal system of claim 1, wherein the actuator comprises a motor.

4. The accelerator pedal system of claim 1, wherein the power delivery unit comprises:

a first gear for receiving the power from the actuator; and a second gear for rotating the wheel as much as a predetermined angle by receiving the power from the first gear.

5. The accelerator pedal system of claim 4, wherein the first gear comprises a spur gear and the second gear comprises a worm gear.

6. The accelerator pedal system of claim 4, wherein the wheel comprises a worm wheel.

7. The accelerator pedal system of claim 6, further comprising a damper for damping the wheel.

* * * * *